United States Patent
Wang et al.

(10) Patent No.: US 9,112,376 B2
(45) Date of Patent: Aug. 18, 2015

(54) AC BACKUP POWER SYSTEM

(71) Applicant: ACBEL POLYTECH INC., New Taipei (TW)

(72) Inventors: Shih-Yuan Wang, New Taipei (TW); Wen-Nan Lin, New Taipei (TW)

(73) Assignee: ACBEL POLYTECH INC., New Taipei (TW)

( * ) Notice: Subject to any disclaimer, the term of this patent is extended or adjusted under 35 U.S.C. 154(b) by 424 days.

(21) Appl. No.: 13/729,022

(22) Filed: Dec. 28, 2012

(65) Prior Publication Data

US 2014/0183956 A1 Jul. 3, 2014

(51) Int. Cl.
*H02J 9/00* (2006.01)
*H02J 9/06* (2006.01)

(52) U.S. Cl.
CPC .......... *H02J 9/062* (2013.01); *H02J 2009/068* (2013.01); *Y10T 307/615* (2015.04)

(58) Field of Classification Search
CPC .............................. H02J 9/06; H02J 2009/068
See application file for complete search history.

(56) References Cited

U.S. PATENT DOCUMENTS

| | | | | |
|---|---|---|---|---|
| 5,939,799 A * | 8/1999 | Weinstein | ........................ | 307/64 |
| 6,330,176 B1 * | 12/2001 | Thrap et al. | .................... | 363/142 |
| 8,004,115 B2 * | 8/2011 | Chapel et al. | .................... | 307/64 |

* cited by examiner

*Primary Examiner* — Daniel Cavallari
(74) *Attorney, Agent, or Firm* — Pai Patent & Trademark Law Firm; Chao-Chang David Pai

(57) ABSTRACT

An AC backup power system controls a power supply to selectively connect to a primary AC power source or a backup AC power source through a switching module. The switching module is controlled by a monitoring module. The monitoring module has a power monitoring unit, a first circuit switch, a second circuit switch, and a first processor. When the power monitoring unit detects an interruption of primary AC current, the first circuit switch that is normally closed is immediately turned off. The first processor then drives the switching module to connect to the backup AC power source. Once the backup AC power source reaches the zero-crossing point, the second circuit switch is turned on so that the backup AC power source provides power to the power supply. The power supply receives power at the zero-crossing point to avoid problems of sparks and coke deposition.

20 Claims, 5 Drawing Sheets

AC BACKUP POWER SYSTEM

BACKGROUND OF THE INVENTION

1. Field of the Invention

The invention relates to an AC backup power system and, in particular, to a power system that ensures that the AC power is supplied to a power supply at the zero-crossing point to avoid problems such as sparks and coke deposition.

2. Description of Related Art

To ensure the stability of power supply, advanced power supply systems all have a redundant design. The so-called redundant power system has two or more power modules working together. When one power module fails and cannot supply power normally, the other power module can immediately take over the job of the failed power module. The above-mentioned redundant design is generally for the load. For input power of the power supply system, there is usually only a single AC power source. Therefore, once the AC power source fails, no power can be supplied to the load even though the power system has a redundant design.

In order to solve the above problems, an AC power supply with the AC backup function has been proposed, as shown in FIG. 5. The AC power supply includes first, second, and third DC power supply modules 71, 72, 73 and a switching circuit 70.

Output terminals of the first, second, and third DC power supply modules 71, 72, 73 connect in parallel to supply power to the load. Input terminals of the first and second DC power supply modules 71, 72 connect respectively to a first and a second AC power source AC1, AC2. The switching circuit 70 has first, second, and third relays 701, 702, 703. The third relay 703 is a 2-to-1 type, having two input terminals and one output terminal. The two input terminals of the third relay 703 connect to the first and second relays 701, 702, respectively. The output terminal of the third relay 703 connects to the input terminal of the third DC power supply module 73. The input terminals of the first and second relays 701, 702 connect respectively to the first and second AC power sources AC1, AC2.

When the first and second AC power source AC1, AC2 operate normally, they provide power to the first and second DC power supply modules 71 and 72, respectively. The first AC power source AC1 also supplies power to the third DC power supply module 73 through the first and third relays 701, 703. Therefore, the first, second, and third DC power supply modules 71, 72, 73 output power in parallel.

If the first AC power source AC1 is interrupted, the first relay 701 opens and the second relay 702 turns from open to closed. The third relay 703 switches to connect to the second relay 702. In this case, the first DC power supply module 71 stops working because of the breakdown of the first AC power source AC1. The second DC power supply module 72 keeps working because the second AC power source AC2 is normal. The third DC power supply module 73 obtains power from the second AC power source AC2 via the third and second relays 703, 702, thereby working in parallel with the second DC power supply module 72.

The above-mentioned case specifically emphasizes that the switching of the switching circuit 70 must be done at a particular time, i.e. the zero-crossing point, of the AC power so as to avoid surges and sparks while switching. In practice, a microprocessor is employed to monitor the AC power, in the hope that the microprocessor can precisely control the relays to switch exactly at the zero-crossing point. However, the above-mentioned case uses the relays as the switching elements, and the relays are mechanical switches. It has the problem of time delay. Even if the microprocessor detects the zero-crossing point, the actual response of switching operations made by the relays do not occur at the zero-crossing point. Since the switching operations are not at the zero-crossing point, there are generally surges and sparks, which still result in the coke deposition problem. So the problem in the prior art is not effectively solved.

SUMMARY OF THE INVENTION

An objective of the invention is to provide an AC backup power system, which ensures that the AC power is switched at the zero-crossing point to avoid spark and energy loss problems.

To achieve the above-mentioned objective, the power system comprises:

a power supply having an input circuit;

a switching module comprising a first switching unit and a second switching unit, input terminals of the first and second switching units connected respectively to a primary AC power source and a backup AC power source, and output terminals of the first and second switching units controllably connected to the input circuit of the power supply; and a monitoring module comprising a processing unit;

a power monitoring unit having input terminals connected to the primary and backup AC power sources and having output terminals connected to the processing unit;

a first circuit switch controlled by the processing unit to be turned on or off and connected in series between the switching module and the input circuit of the power supply; and a second circuit switch which is an electronic switch controlled by the processing unit to be on or off and connected in parallel to the first circuit switch.

Under the normal condition, the AC backup power system uses the primary AC power source to supply power to the power supply via the first switching unit of the switching module and the first circuit switch. The processing unit of the monitoring module monitors the status of the primary and backup AC power sources via the power monitoring unit at all time.

When the primary AC power source is abnormal or interrupted, the processing unit disconnects the first switching unit from the first circuit switch, and then turns on the second switching unit so that the switching module connects to the backup AC power source. On the other hand, the processing unit checks whether the backup AC power source reaches a zero-crossing point. When the zero-crossing point is reached, the second circuit switch is connected. In this situation, the backup AC power is supplied to the power supply through the second switching unit and the second circuit switch.

Since the second circuit switch is an electronic switch, it ensures that the switching action occurs exactly at the zero-crossing point. After the power supply becomes stable, the processing unit turns on the first circuit switch and disconnects the second circuit switch. When the primary AC power source resumes, the above-mentioned scheme is applied. The closed first circuit switch and second switching unit are disconnected. The system checks whether the primary AC power source reaches a zero-crossing point. When the zero-crossing point is reached, the second circuit switch is connected. In this case, the backup AC power source supplies power to the power supply via the second switching unit and the second circuit switch of the switching module. After the power supply becomes stable, the processing unit connects the first circuit switch and disconnects the second circuit switch.

Using the above-mentioned technique, the invention ensures that the AC power is switched at the zero-crossing point to avoid input surges, switching sparks and coke deposition.

DETAILED DESCRIPTION OF THE PREFERRED EMBODIMENT

Figure 1:
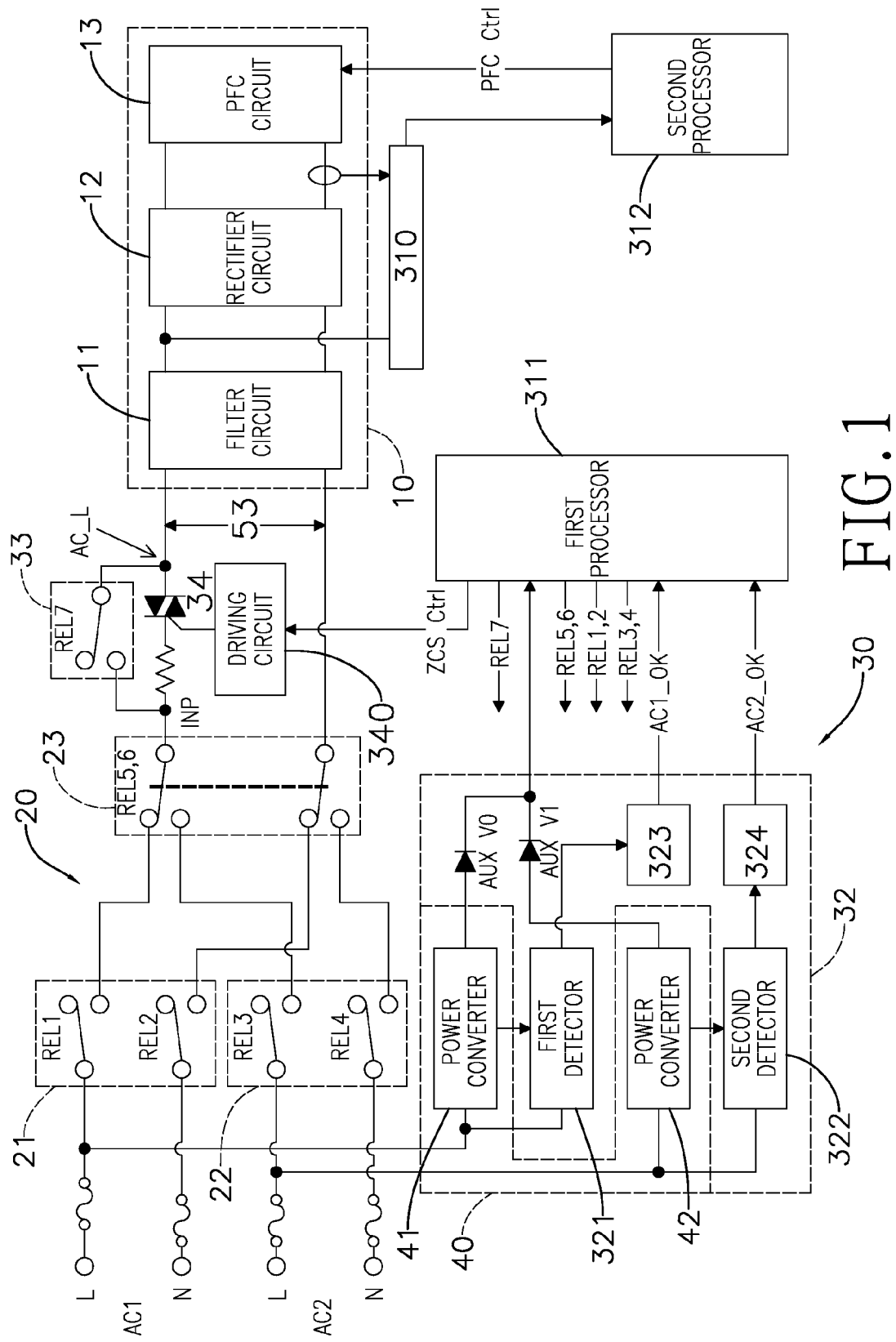
FIG. 1 is a circuit block diagram of a preferred embodiment of the invention.

The circuit of a preferred embodiment of an AC backup power system of the invention is shown in FIG. 1. The AC backup power system comprises a power supply 10, a switching module 20, and a monitoring module 30.

In this embodiment, the power supply 10 includes a filter circuit 11, a rectifier circuit 12 and a power factor correction circuit (PFC) 13. Output terminals of the PFC circuit 13 can further connect to a DC-to-DC (DC/DC) converter. The power supply 10 forms an input circuit on the input terminal of the rectifier circuit 12.

The switching module 20 has a first switching unit 21 and a second switching unit 22. Input terminals of the first and second switching units 21, 22 connect respectively to a primary AC power source AC1 and a backup AC power source AC2. Output terminals of the first and second switching units 21, 22 connect switchably to the input circuit of the power supply 10. In this embodiment, the switching module 20 further has a third switching unit 23 between the first and second switching units 21, 22 and the power supply 10.

The first switching unit 21 comprises two relays REL1, REL2. Each relay REL1, REL2 has a common terminal, a normally open contact and a normally closed contact. The two common terminals of the relays REL1, REL2 respectively connect to two power lines L, N of the primary AC power source AC1.

The second switching unit 22 comprises two relays REL3, REL4. Each relay REL3, REL4 has a common terminal, a normally open contact and a normally closed contact. The two common terminals of the two relays REL3, REL4 respectively connect to two power lines L, N of the backup AC power source AC2.

The third switching unit 23 comprises two interlocking relays REL5, REL6. Each interlocking relay REL5, REL6 has a common terminal, a normally open contact and a normally closed contact. The two common terminals of the two interlocking relays REL5, REL6 respectively connect to the input circuit of the power supply 10. The normally open contacts and normally closed contacts of the two interlocking relays REL5, REL6 connect to the normally open contacts and the normally closed contacts of the relays REL1 to REL4 of the first and second switching units 21 and 22. The switching module 20 is controlled by the monitoring module 30 to select either the primary AC power source AC1 or the backup AC power source AC2 to connect to the input circuit of the power supply 10.

The monitoring module 30 includes a first processor 311, a second processor 312, a power monitoring unit 32, a first circuit switch 33 and a second circuit switch 34.

The first processor 311 controls the switching of each of the switching units 21-23 of the switching module 20 and receives an AC signal from the power supply 10. The second processor 312 connects to an output terminal of the filter circuit 11 of the power supply 10 and an output terminal of the rectifier circuit 12 via an AC signal detection circuit 310, thereby obtaining the AC signal.

The power monitoring unit 32 has input terminals connected with the primary and backup AC power sources AC1, AC2 and output terminals connected to the first processor 311. In this embodiment, the power monitoring unit 32 includes a first detector 321 and a second detector 322. Input terminals of the first and second detectors 321, 322 connect respectively to the primary AC power source AC1 and the backup AC power source AC2. Output terminals of the first and second detectors 321, 322 connect respectively to the first processor 311 of the first processor 311 via photo couplers 323, 324.

The first circuit switch 33 is controlled to be turned on or off by the first processor 311. The first circuit switch 33 is normally closed and connected in series between the switching module 20 and the input circuit of the power supply 10. In this embodiment, the first circuit switch 33 is a relay REL7. The first processor 311 controls the on and off of the first circuit switch 33.

The second circuit switch 34 is an electronic switch and connected in series between the switching module 20 and the input circuit of the power supply 10, thus in parallel with the first circuit switch 33. The second circuit switch 34 is controlled to be on and off by the first processor 311. In this embodiment, the second circuit switch 34 is a bidirectional triode thyristor, i.e. TRIAC. The gate of the TRIAC for controlling the on and off of the TRIAC connects to the first processor 311 via a driving circuit 340. That is, the first processor 311 controls the on and off of the second circuit switch 34 via the driving circuit 340.

In addition to the above-mentioned modules, the invention further includes a power module 40 for supplying power to the monitoring module 30. The power module 40 comprises two power converters 41, 42. Input terminals of the two power converters 41, 42 connect respectively to the primary AC power source AC1 and the backup AC power source AC2. Output terminals of the two power converters 41, 42 connect respectively to the first and second detectors 321, 322 and the first and second processors 311, 312 to supply the required working power. In this embodiment, the two power converters 41, 42 are flyback converters.

Figure 2:
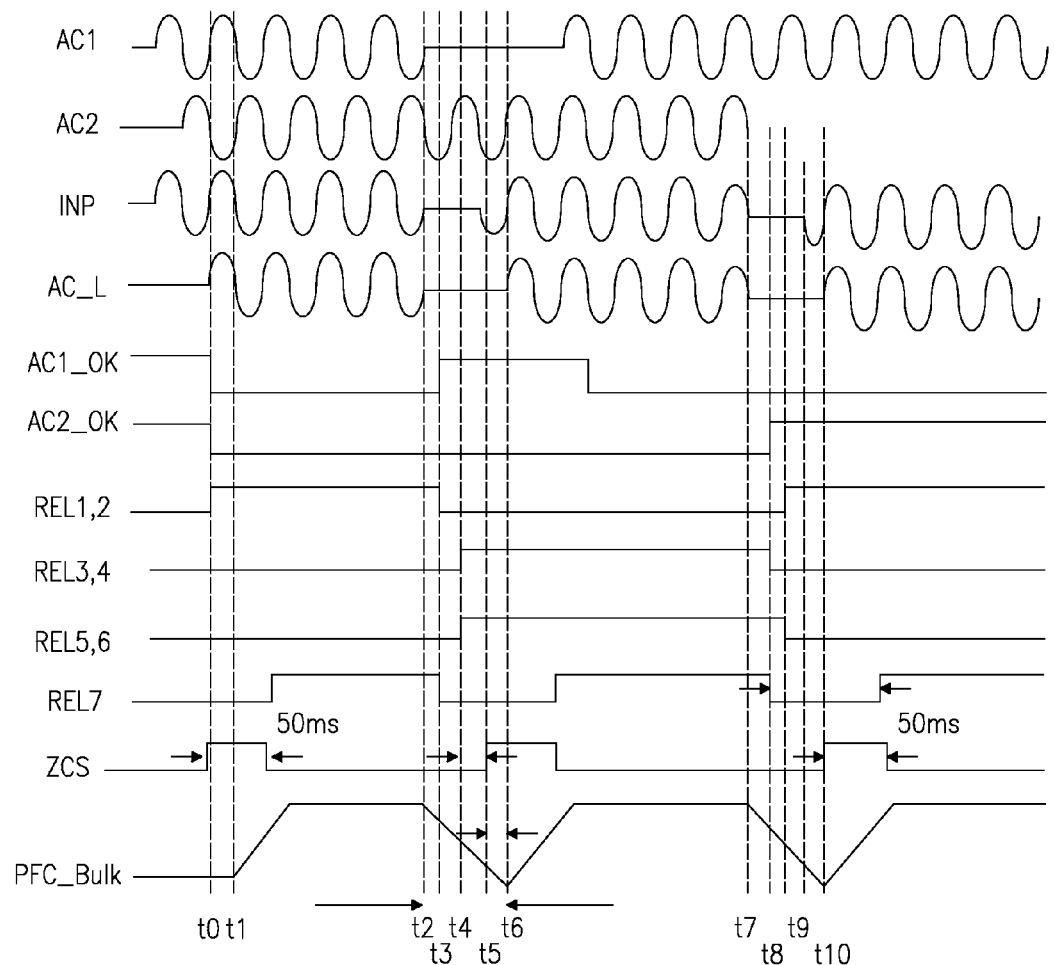
FIG. 2 is a sequence diagram of the invention.

With reference to FIG. 2, when the primary AC power source AC1 and the backup AC power source AC2 function normally (t0), the first and second detectors 321, 322 of the power monitoring unit 30 detect the power source signals of the primary AC power source AC1 and the backup AC power source AC2, and send two normal signals AC1_OK, AC2_OK (low potential) to the first processor 311 (t1). The backup AC power source AC2 temporarily stops providing power. At this time, the relays REL5, REL6 of the third switching unit 23 are normally closed and connected with the first switching unit 21. The relays REL1, REL2 of the first switching unit 21 are driven by the first processor 311 and switched to connect to the third switching unit 23. The first circuit switch 33 is driven by the first processor 311 to close. The primary AC power source AC1 sends power through the first and third switching units 21, 23 and the first circuit switch 33 to the power supply 10. A capacitor in the power factor correction circuit 13 starts to be charged, raising its output voltage (PFC_Bulk), as detected by the first processor 311.

When the primary AC power source AC1 is interrupted or abnormal (t2), the first detector 321 stops sending the normal signal AC1_OK to the first processor 311. After a few milliseconds (ms) of confirmation, the first processor 311 breaks the closed first circuit switch 33. In this case, no power enters the power supply 10. No current passes through the first circuit switch 33. Therefore, it prevents sparks from occurring on the first circuit switch 33. This in turn solves the problem of coke deposition derived from sparks. Since the first circuit switch 33 is turned off, the output voltage (PFC_Bulk) of the power factor correction circuit 13 continues to decline.

Subsequently, the first processor 311 disconnects the first switching unit 21 from the third switching unit 23 and connects the second switching unit 22 to the third switching unit 23, thereby preparing the backup AC power source AC2 in a standby power supplying state (t4). Since the first and the second circuit switches 33, 34 are not closed, no energy flows into the power supply 10. The first processor 311 uses the second detector 322 to check whether the backup AC power source AC2 reaches the zero-crossing point (t5). When the zero-crossing point is reached, the first processor 311 then triggers the second circuit switch 34 to turn on via the driving circuit 340. The third switching unit 23 then connects to the input circuit of the power supply 10 via the second circuit switch 34. Since the second circuit switch 34 is an electronic switch, it ensures the switching at the zero-crossing point. At this moment, the output voltage (PFC Bulk) of the power factor correction circuit 13 starts to rise.

After the power supply is stable (after the second circuit switch 34 is turned on for 50 ms in this embodiment), the first processor 311 turns on the first circuit switch 33 and turns off the second circuit switch 34 (t6), restoring the connection of the first circuit switch 33 to the input circuit of the power supply 10. The backup AC power source AC2 continues to supply power to the power supply 10 (t7). In the above-mentioned process, after the power supply is stable, the first circuit switch 33 is turned on to connect to the input circuit of the power supply 10. This means that the second circuit switch 34 functions as a relay switch. The reason for such a design is that using the electronic second circuit switch 34 to connect to the power supply 10 has a bigger power loss than using the first circuit switch 33. After the power supply becomes stable, the first circuit switch 33 is restored to connect to the input circuit of the power supply 10, thereby reducing power loss. Furthermore, the conduction voltage of the second circuit switch 34 is very low. When the first circuit switch 33 is switched back, the voltage clamping of the second circuit switch 34 also reduces its conduction voltage. Therefore, it can effectively avoid sparks and coke deposition in the first circuit switch 33.

When the primary AC power source AC1 restores the normal power supply, the backup AC power source AC2 can keep supplying power. When the backup AC power source AC2 is interrupted or abnormal, the primary AC power source AC1 is switched back on following the above-mentioned steps. The steps are further explicitly described as follows:

When the backup AC power source AC2 is interrupted or abnormal (t8), the second detector 322 stops sending the normal signal AC2_OK to the first processor 311. After a few milliseconds (ms) of confirmation, the first processor 311 breaks the closed first circuit switch 33, in order to block the energy from entering into the power supply 10. As described above, the first circuit switch 33 is turned off to prevent sparks produced when the current flows through and coke deposition on the switch. Since the first circuit switch 33 is turned off, the output voltage (PFC_Bulk) of the power factor correction circuit 13 drops.

Afterwards, the first processor 311 disconnects the second switching unit 22 from the third switching unit 23 and connects the third switching unit 23 to the first switching unit 21, so that the primary AC power source AC1 is in standby power supply state (t9). The first processor 311 uses the first detector 321 to detect whether the primary AC power source AC1 reaches the zero-crossing point. When the zero-crossing point is reached, the first processor 311 then triggers the second circuit switch 34 to be conductive through the driving circuit 340. The third switching unit 23 then connects to the power supply circuit of the power supply 10 through the second circuit switch 34. The output voltage (PFC_Bulk) of the power factor correction circuit 13 of the power supply 10 thus starts to rise. After the power supply becomes stable (after the second circuit switch 34 is turned on for 50 ms in this embodiment), the first processor 311 turns on the first circuit switch 33 and turns off the second circuit switch 34 (t10). The first circuit switch 33 connects to the input circuit of the power supply. The primary AC power source AC1 continues to supply power to the power supply 10.

As described above, the second circuit switch 34 functions as a relay switch to ensure that the switching is done at the zero-crossing point. After the power supply becomes stable, the first circuit switch 33 connects to the input circuit of the power source circuit to reduce power loss. Furthermore, the second circuit switch 34 has a low conduction voltage. When the first circuit switch 33 is switched back, the clamp of the second circuit switch 34 also reduces the conduction voltage. Therefore, this can effectively prevent sparks and coke deposition on the first circuit switch 33.

According to the above description, the disclosed backup power system uses a primary AC power source and a backup AC power source to supply power to a power supply alternately. The switching between the primary AC power source and the backup AC power source is done by the electronic second circuit switch accurately at the zero-crossing point. While switching, the first circuit switch comprised of relays is turned off, and therefore no current flows through. On the other hand, after the power supply becomes stable, the first circuit switch switches back to the input circuit of the power supply circuit. Due to the clamping of the second circuit switch, the conduction voltage is small. Therefore, the invention can effectively prevent the production of sparks and the problem of coke deposition.

Figure 3:
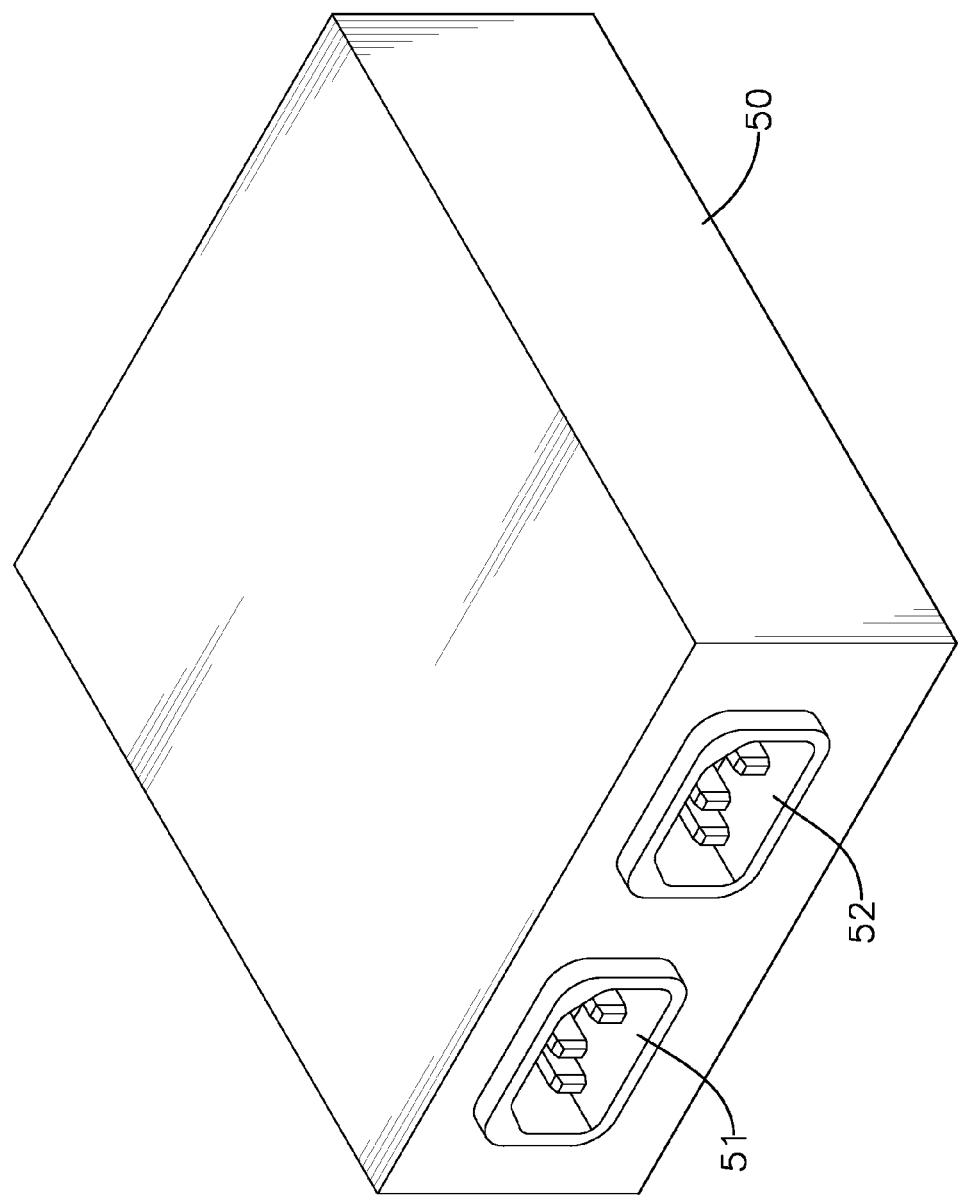
FIG. 3 is a perspective view of a power switching device of the present invention.
Figure 4:
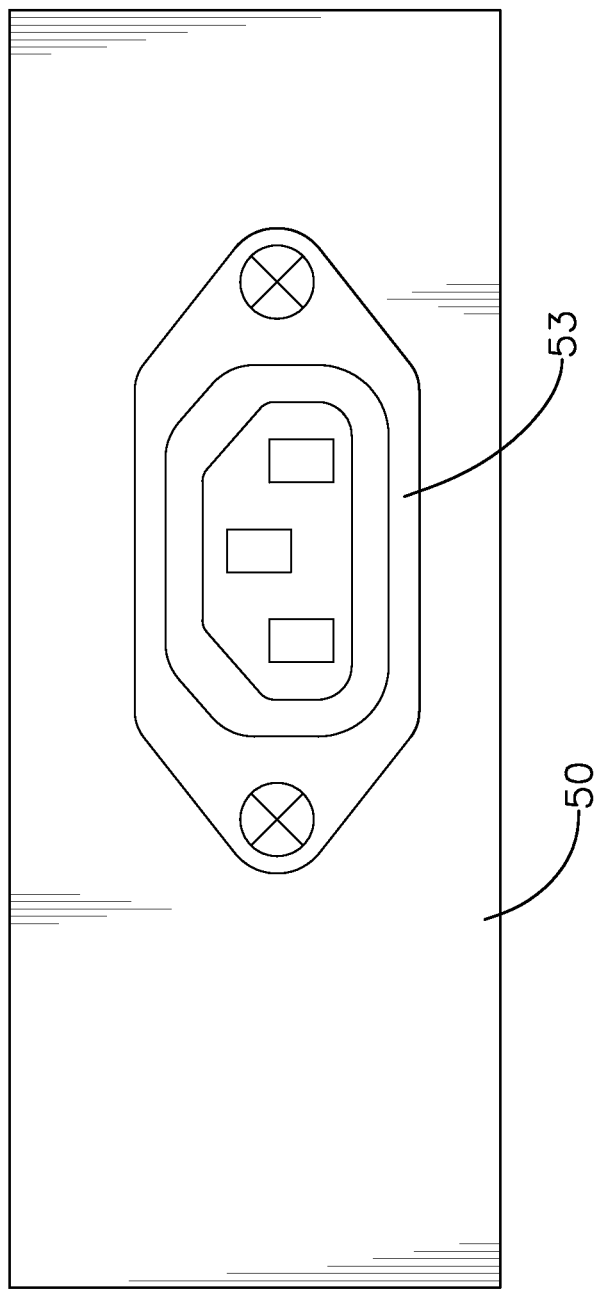
FIG. 4 is a planner view of the power switching device of FIG. 3.
Figure 5:
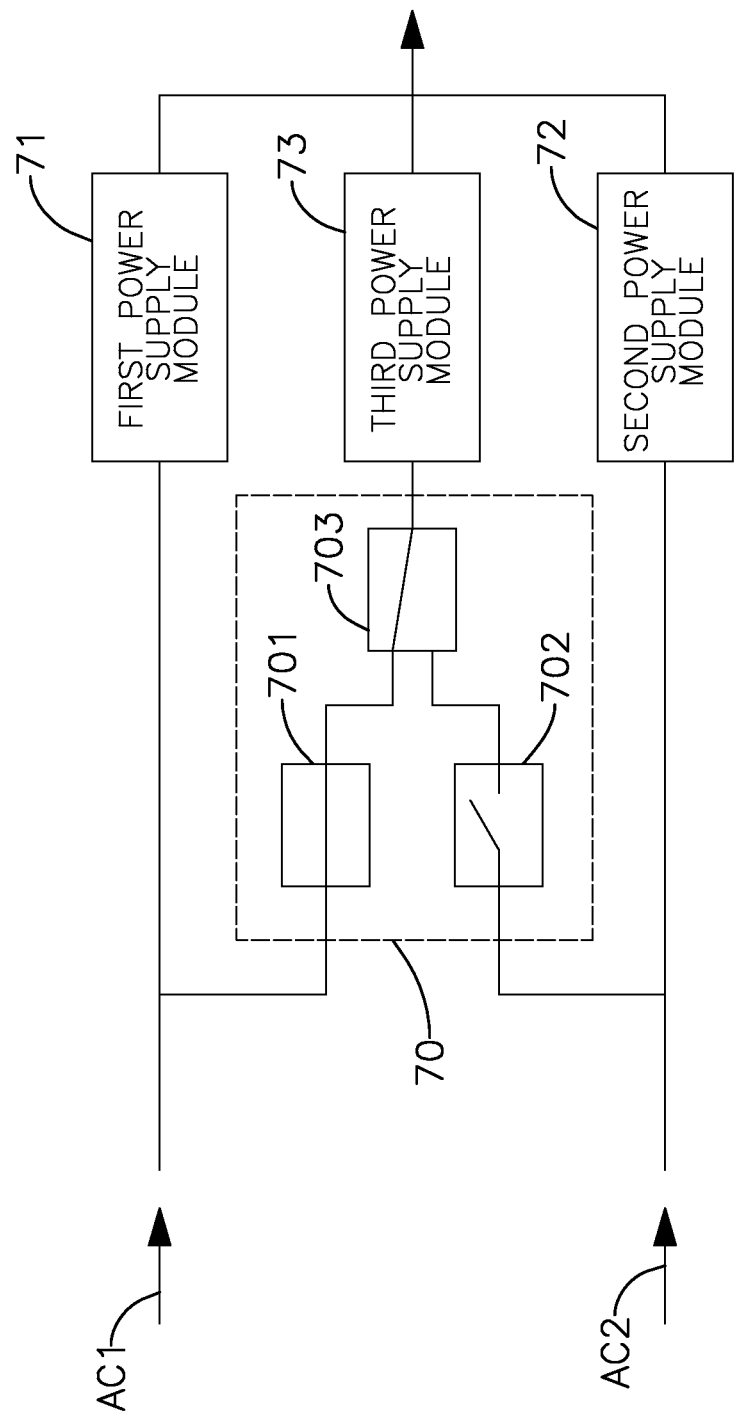
FIG. 5 is a circuit block diagram of a conventional power supply device with the AC backup function.

With reference to FIG. 3, the switching module 20 and the monitoring module 30, or further including the power module 40, can be mounted in a case 50 as a separate power switching device. Two power input ports 51, 52 are provided on a surface of the case 50 for connecting to the primary AC power source AC1 and the backup AC power source AC2 respectively. The two power input ports 51, 52 are respectively connected to the first switching unit 21 and the second switching unit 22. Further, a power output port 53 is provided on another surface of the case for connecting to the power supply 10. The power output port 53 is connected to the third switching unit 23 and the first circuit switch 33 as shown in FIG. 1.

While the invention has been described by way of example and in terms of the preferred embodiment, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. An AC backup power system comprising:
a power supply having an input circuit;
a switching module comprising a first switching unit and a second switching unit, input terminals of the first and second switching units connected respectively to a primary AC power source and a backup AC power source, and output terminals of the first and second switching units controllably connected to the input circuit of the power supply; and
a monitoring module comprising
a first processor;
a power monitoring unit having input terminals connected to the primary and backup AC power sources and having output terminals connected to the first processor;
a first circuit switch controlled by the first processor to be turned on or off and connected in series between the switching module and the input circuit of the power supply; and
a second circuit switch which is an electronic switch controlled by the first processor to be on or off and connected in parallel to the first circuit switch;
wherein when an input power of the input circuit of the power supply is abnormal, the first processor turns off the first circuit switch, and then turns on the second circuit switch at the time when no current flows to the input circuit of the power supply.

2. The AC backup power system as claimed in claim 1, wherein the first circuit switch comprises a relay and the second circuit switch comprises a TRIAC, and a gate of the TRIAC is connected with the first processor of the monitoring module via a driving circuit.

3. The AC backup power system as claimed in claim 2, wherein a third switching unit is connected between the power supply and both the first and second switching units, wherein
the first switching unit comprises two relays REL1, REL2, each of which has a common terminal, a normally open contact and a normally closed contact, and the two common terminals of the two relays REL1, REL2 are connected respectively to two power lines of the primary AC power source;
the second switching unit comprises two relays REL3, REL4, each of which has a common terminal, a normally open contact and a normally closed contact, and the two common terminals of the two relays REL3, REL4 are connected respectively to two power lines of the backup AC power source; and
the third switching unit comprises two interlocking relays REL5, REL6, each of which has a common terminal, a normally open contact and a normally closed contact; the two common terminals of the interlocking relays REL5, REL6 are connected to the input circuit of the power supply, and the normally open contacts and normally closed contacts of the interlocking relays REL5, REL6 are connected to the normally open contacts and the normally closed contacts of the relays REL1, REL2, REL3, REL4 of the first and second switching units.

4. The AC backup power system as claimed in claim 3, wherein the power supply comprises a filter circuit, a rectifying circuit, and a power factor correction circuit.

5. The AC backup power system as claimed in claim 1, wherein the second processor is connected to the power monitoring unit and the switching module.

6. The AC backup power system as claimed in claim 2, wherein the second processor is connected to the power monitoring unit and the switching module.

7. The AC backup power system as claimed in claim 3, wherein the second processor is connected to the power monitoring unit and the switching module.

8. The AC backup power system as claimed in claim 5, wherein the power monitoring unit of the monitoring module includes a first detector and a second detector, input terminals of the first and second detectors are connected respectively to the primary AC power source and the backup AC power source, and output terminals of the first and second detectors are connected to the first processor of the processing unit.

9. The AC backup power system as claimed in claim 6, wherein the power monitoring unit of the monitoring module includes a first detector and a second detector, input terminals of the first and second detectors are connected respectively to the primary AC power source and the backup AC power source, and output terminals of the first and second detectors are connected to the first processor of the processing unit.

10. The AC backup power system as claimed in claim 7, wherein the power monitoring unit of the monitoring module includes a first detector and a second detector, input terminals of the first and second detectors are connected respectively to the primary AC power source and the backup AC power source, and output terminals of the first and second detectors are connected to the first processor of the processing unit.

11. The AC backup power system as claimed in claim 8, wherein the first and second detectors are connected respectively to the first processor via a first photo coupler, and the first processor is connected to the second processor via a second photo coupler.

12. The AC backup power system as claimed in claim 9, wherein the first and second detectors are connected respectively to the first processor via a first photo coupler, and the first processor is connected to the second processor via a second photo coupler.

13. The AC backup power system as claimed in claim 10, wherein the first and second detectors are connected respectively to the first processor via a first photo coupler, and the first processor is connected to the second processor via a second photo coupler.

14. The AC backup power system as claimed in claim 11 further comprising a power module having two power converters, input terminals of the two power converters connected respectively to the primary AC power source and the backup AC power source, and output terminals of the two power converters connected to the first and second detectors and the first processor.

15. The AC backup power system as claimed in claim 12 further comprising a power module having two power converters, input terminals of the two power converters connected respectively to the primary AC power source and the backup AC power source, and output terminals of the two power converters connected to the first and second detectors and the first processor.

16. The AC backup power system as claimed in claim 13 further comprising a power module having two power converters, input terminals of the two power converters connected respectively to the primary AC power source and the backup AC power source, and output terminals of the two power converters connected to the first and second detectors and the first processor.

17. The AC backup power system as claimed in claim 14, wherein the two power converters are flyback power converters.

18. The AC backup power system as claimed in claim 15, wherein the two power converters are flyback power converters.

19. The AC backup power system as claimed in claim 5, wherein the first processor of the processing unit controls the first circuit switch to turn on or off.

20. The AC backup power system as claimed in claim 3, wherein the switching module and the monitoring module are mounted in a case as a power switching device; and
    the case has
        two power input ports formed on a surface of the case and connected to the input terminals of the first and second switching units, wherein the two power input ports are provided to connect to the primary AC power source and the backup AC power source respectively; and
        a power output port formed on another surface of the case and connected to the third switching unit and the first circuit switch, wherein the power output port is provided to connect to the power supply.

* * * * *